(12) United States Patent
Falkenreck et al.

(10) Patent No.: US 9,097,464 B2
(45) Date of Patent: Aug. 4, 2015

(54) CONTINUOUS SCRAP SUPPLY INTO AN ELECTRIC ARC FURNACE (EAF)

(75) Inventors: Udo Falkenreck, Bochum (DE); Hans-Jürgen Odenthal, Mettmann (DE)

(73) Assignee: SMS Siemag AG, Duesseldorf (DE)

( * ) Notice: Subject to any disclaimer, the term of this patent is extended or adjusted under 35 U.S.C. 154(b) by 254 days.

(21) Appl. No.: 13/057,586

(22) PCT Filed: Aug. 3, 2009

(86) PCT No.: PCT/DE2009/001097
§ 371 (c)(1),
(2), (4) Date: Feb. 25, 2011

(87) PCT Pub. No.: WO2010/015243
PCT Pub. Date: Feb. 11, 2010

(65) Prior Publication Data
US 2012/0104668 A1 May 3, 2012

(30) Foreign Application Priority Data
Aug. 6, 2008 (DE) .......................... 10 2008 037 111

(51) Int. Cl.
*F27D 13/00* (2006.01)
*F27D 17/00* (2006.01)
(Continued)

(52) U.S. Cl.
CPC ............... *F27D 3/0025* (2013.01); *F27B 3/085* (2013.01); *F27B 3/18* (2013.01); *F27D 17/003* (2013.01)

(58) Field of Classification Search
CPC .......... F27B 3/085; F27B 3/18; F27D 3/0025; F27D 17/003; C21C 5/5294; C21C 5/565; C21C 5/567
USPC ................ 266/144, 44, 251; 373/8, 9, 79, 80; 432/239, 109, 243
See application file for complete search history.

(56) References Cited

U.S. PATENT DOCUMENTS

| 1,299,336 | A | | 4/1919 | Hechenbleikner |
| 3,645,516 | A | * | 2/1972 | Turpin et al. .................... 432/17 |

(Continued)

FOREIGN PATENT DOCUMENTS

| EP | 190 313 | 2/1986 |
| EP | 0 289 297 | 11/1988 |

(Continued)

OTHER PUBLICATIONS

Contract N 6770 Between Sovel S.A. and "Techint Compagnia Tecnica Internatzionale S.p.A.", for the supply of One Consteel System, Dec. 6, 2005.

(Continued)

*Primary Examiner* — Roy King
*Assistant Examiner* — Michael Aboagye
(74) *Attorney, Agent, or Firm* — Cozen O'Connor

(57) ABSTRACT

A continuous scrap feed into an electric smelting furnace (EAF) having a channel connected at one end to an opening in a wall of the smelting furnace and has at its other end a charging device for the scrap. An extraction device for the off-gases which are guided through the channel serve to preheat the scrap, this extraction device being connected to the channel between the two ends of the channel located closer to the smelting furnace than the scrap feed in relation to the total length of the channel. The extraction device is a single-stage blower whose intake opening is oriented in the direction of the smelting furnace, and the clear cross section of the channel between the extraction device and the scrap feed is adapted to the amount of scrap so that the height of the scrap charge substantially fills the clear cross section.

8 Claims, 1 Drawing Sheet

(51) Int. Cl.
*F27D 3/00* (2006.01)
*F27B 3/08* (2006.01)
*F27B 3/18* (2006.01)

(56) References Cited

U.S. PATENT DOCUMENTS

| | | | | |
|---|---|---|---|---|
| 3,758,267 | A | * | 9/1973 | Berk .................... 432/134 |
| 4,383,678 | A | * | 5/1983 | Longenecker ............ 266/142 |
| 5,044,567 | A | * | 9/1991 | Hte et al. ............... 241/73 |
| 5,400,358 | A | * | 3/1995 | Vallomy ................ 373/80 |
| 5,406,579 | A | * | 4/1995 | Vallomy ................ 373/77 |
| 5,647,288 | A | * | 7/1997 | Matsumoto et al. ...... 110/228 |
| 6,155,333 | A | * | 12/2000 | Vallomy ............... 164/476 |
| 7,767,136 | B2 | | 8/2010 | Argenta et al. |
| 2001/0055739 | A1 | | 12/2001 | Vallomy |
| 2004/0136946 | A1 | | 7/2004 | Fredenburgh et al. |
| 2009/0031854 | A1 | | 2/2009 | Argenta et al. |

FOREIGN PATENT DOCUMENTS

| | | | |
|---|---|---|---|
| EP | 0 592 723 | | 4/1994 |
| EP | 744 585 | | 11/1996 |
| EP | 0744585 | * 11/1996 | ............ F27D 13/00 |
| EP | 0 747 492 | | 12/1996 |
| EP | 1 096 959 | | 5/2001 |
| JP | 08-157930 | | 6/1996 |
| WO | WO 2006/089897 | | 8/2006 |
| WO | WO 2007/006558 | | 1/2007 |

OTHER PUBLICATIONS

Sonasid Societe Nationale De Siderurgie Steel Plant Project at Jorf Lasfar Morocco, Contract between Sonasid & Techint, Package 1b Continuous Feeding System, Jun. 13, 2003.

\* cited by examiner

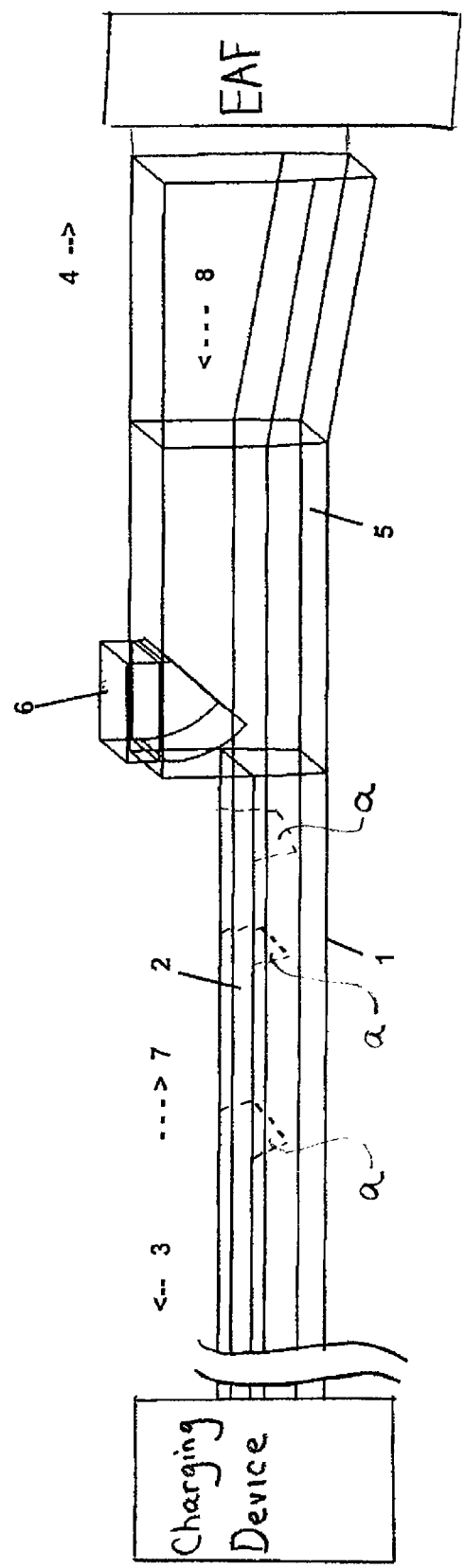

CONTINUOUS SCRAP SUPPLY INTO AN ELECTRIC ARC FURNACE (EAF)

PRIORITY CLAIM

This is a U.S. national stage of Application No. PCT/DE20091001097, filed on Aug. 3, 2009, which claims priority to German Application No: 10 2008 037 111.4, filed: Aug. 6, 2008, the contents of which are incorporated herein by reference.

BACKGROUND OF THE INVENTION

1. Field of the Invention

The invention is directed to a continuous scrap feed into an electric smelting furnace (EAF), a channel that is connected at one end to an opening in the wall of the smelting furnace and has at its other end a charging device for the scrap, and an extraction device for the off-gases from the smelting process which are guided through the channel and which serve to preheat the scrap, this extraction device being connected to the channel between the two ends of the channel, wherein the extraction device is located closer to the end of the channel facing the smelting furnace than to the end facing the scrap feed in relation to the total length of the channel.

2. Related Art

Continuous scrap feed into an electric arc furnace is known, for example, from EP 744 585 B1, EP 190 313 B2, U.S. Pat. No. 5,400,358, or WO 20071006558 A2.

With an edge length of less than 1.5 m, a size of the scrap pieces on a feed belt can be very large. It can be deduced from this that a corresponding opening in the side of the EAF will be about 3 to 4 $m^2$. At all events, this opening would have to be closed during smelting with conventional dust extraction technology because the infiltration of false air into the smelting vessel would otherwise be too high.

At present, a blower for extracting process gases in continuous scrap feeding is typically located in the area of the scrap feed so that the EAF gases are drawn a long distance over the charged scrap.

Two past suggestions for reducing the infiltration of false air into the EAF and increasing the efficiency of dust extraction were:

1. Positioning a second blower next to the exhaust and controlling its output by negative pressure in the scrap supply tunnel of the EAF; or
2. Providing a mechanical barrier to increase air resistance at the inlet into the scrap feed.

Control for purposes of the first solution is very costly and cannot be monitored satisfactorily. Further, it is very maintenance-intensive. An additional amount of electrical energy is consumed by the second blower.

The second solution employs flow resistances in the scrap supply tunnel that must be precisely scaled to suction power and the amount of process gases.

In both solutions, the furnace gas (depending on construction and furnace size) is extracted along a length of 30 to 50 m so that it is cooled and must be heated again to a temperature of >700° C. (temperature is a function of the $O_2$ content in the off-gas) by an auxiliary burner to suppress emission of furans and dioxins.

It has already been proposed that the extraction device be positioned closer to the end of the channel facing the smelting furnace than to the end facing the scrap feed in relation to the total length of the channel.

Scrap and off-gases move in opposite directions in the channel; while the scrap is conveyed into the smelting furnace, the off-gas is drawn away from the smelting furnace.

The extraction device and its shaft for extracting the off-gases from the EAF, which is constructed with a continuous charging, are positioned at the channel in such a way that the extraction device and its shaft are in proximity to the smelting furnace and the distance from the position where the scrap and (possible) additions are fed is appreciably greater. In addition, movable flaps can be installed to increase the flow resistance in the area of the scrap feed and, therefore, to more fully exploit the capacity of the extraction device in relation to the arc furnace.

The ratio of channel length to the EAF to channel length to the scrap feed could be 1 to 2, for example.

Analyses of existing installed EAFs with continuous scrap charging has shown that the heat of an appreciable subsequent combustion of high-CO off-gases that can be delivered to the supplied scrap is locally limited to only the first few meters behind the smelting furnace. Also, the sensible heat of the off-gases can only be made use of to a limited degree in this area.

Because of the residual heat in the off-gas, a positioning of the intake connection as a function of the amount of off-gas and the output of the EAF requires, if any, only a limited additional amount of energy needed to adjust the off-gas temperature and, accordingly, to suppress furans and dioxins.

SUMMARY OF THE INVENTION

It is an object of the invention to safely remove the off-gases of thermal reactions, smelting reactions and chemical reactions from the EAF by a single-stage extraction without a large amount of false air infiltrating along the scrap feed tunnel and, therefore, without having to unnecessarily increase the suction exhaust capacity.

In a continuous scrap feed into an electric smelting furnace (EAF), there is provided a channel connected at one end to an opening in the wall of the smelting furnace and has at its other end a charging device for the scrap, and an extraction device for the off-gases from the smelting process which are guided through the channel and which serve to preheat the scrap, this extraction device being connected to the channel between the two ends of the channel, wherein the extraction device is located closer to the end of the channel facing the smelting furnace than to the end facing the scrap feed in relation to the total length of the channel. According to one embodiment of the invention, the extraction device is constructed as a single-stage blower whose intake opening is oriented substantially in the direction of the smelting furnace, and a clear cross section of the channel between the extraction device and the scrap feed is adapted to the amount of scrap to be fed that the height of the scrap charge substantially fills the clear cross section.

The intake opening preferably extends over the entire width of the scrap feed.

It is particularly advantageous when the intake opening forms an acute angle with the scrap feed.

According to another construction, but one which is less optimal, the plane formed by the intake opening is oriented perpendicular to the scrap feed.

The ratio of the length of the channel from the extraction device to the smelting furnace and to the charging device, respectively, can be 1 to 6.

Further, movable flaps projecting into the clear cross section of the channel can be provided at the end of the channel facing the charging device.

According to one embodiment of the invention, the cross section of the channel between the extraction device and the scrap feed is appreciably smaller compared to conventional installations. The channel, i.e., the clear cross section of the channel available for the scrap feed, is so dimensioned that the charged amount of scrap substantially fills up this clear cross section. This can be further facilitated in that additional movable or flexible flaps that cover any gap still remaining between the channel cross section and scrap surface can be provided so as to be distributed along the length between the extraction device and the scrap feed so as to minimize the possible intake of false air proceeding from the scrap feed side.

The invention makes it possible to transport scrap continuously into the EAF and to preheat the scrap efficiently while making optimal use of the blower capacity. The furnace off-gas is drawn out in a deliberate manner and used for efficient preheating of scrap. An extraction device of fluid-mechanical design is adapted to the geometric ratios of the enclosure is arranged in the vicinity of the furnace. In contrast to the prior art, the off-gas is conducted only over the area of the scrap charge in which an efficient heating takes place by the off-gas. Therefore, the blower capacity is deliberately used for preheating scrap and the blower size and blower output can be reduced compared to previous installations for preheating scrap. At the same time, the infiltration of false air is minimized by movable flaps in the enclosure and in the area between the scrap feed and the extraction device. Further, due to the extraction of the furnace off-gas at high temperatures above 700° C., formation of dioxins and furans is prevented. Therefore, the invention makes it possible to save on costs while simultaneously reducing environmental loading.

The invention offers an efficient solution to the set of problems posed by dust extraction with low energy consumption in the case of continuous scrap charging.

BRIEF DESCRIPTION OF DRAWINGS

The invention will be described in the following with reference to an embodiment example.

FIG. 1 is a channel for the scrap feed into an EAF.

DETAILED DESCRIPTION OF THE DRAWINGS

In particular, the channel is designated by 1. This channel 1 extends from the charging device for the scrap, indicated by arrow 3, to the delivery side which opens into the EAF. This direction is indicated by arrow 4.

This schematic drawing does not show to scale the length of the channel. The distance of the extraction device 6 from the charging device for the scrap, designated for the sake of brevity as scrap feed—i.e., the portion of the channel 1 designated by 2—is about six times as long as the distance of the extraction device 6 from the transition into the EAF. This channel portion is designated by 5.

The transporting direction of the scrap is designated by arrow 7 and that of the hot furnace gas is designated by 8.

The hot furnace off-gases exiting from the EAF are guided in counterflow (opposite) to the scrap transported in the direction of the EAF and preheat the latter in a known manner.

It can be seen from the schematic drawing that the cross section of the channel 1 in portion 2, i.e., in the area between the scrap feed 3 and the extraction device 6, is substantially smaller than in the portion 5 between the extraction device 6 and the EAF.

This cross section of portion 2 is preferably adapted in such a way to the amount of scrap to be charged that the clear cross section of this channel portion is substantially filled by the supplied scrap. Any residual cross section still remaining can be filled by movable or flexible flaps a in the channel so that the false air drawn in from the scrap charging side 3 by the extraction device 6 can be reduced to a minimum by the scrap filling and the flaps, if any.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A continuous scrap feed in an electric arc smelting furnace, comprising:
    a channel including a first end that is connected with an opening in a wall of the smelting furnace;
    a delivery device for delivering scrap, the delivery device located at a second end of the channel; and
    an extraction device for exhaust gases from a smelting process that are conducted through the channel and serve to preheat the scrap, wherein the extraction device is connected with the channel between the first end and the second end, wherein:
        with regard to a total length of the channel, the extraction device is disposed closer to the first end of the channel facing the smelting furnace than the second end facing the device for delivering scrap,
        the extraction device is constructed as a single stage fan having a suction opening substantially aligned in a direction towards the smelting furnace,
        a clear cross-section of a first channel section between the extraction device and the device for delivering scrap has a smaller cross-section than a clear cross-section of a second channel section between the extraction device and the smelting furnace, and
        the clear cross-section of the first channel section between the extraction device and the device for delivering scrap is so matched to a quantity of scrap to be fed that a height of a scrap charge substantially fills out the clear cross-section of the first channel section,
        wherein a ratio of a length of the second channel section from the extraction device to the smelting furnace to a length of the first channel section between the device for delivering scrap and the extraction device is approximately 1 to 6.

2. The scrap feed according to claim 1, wherein the suction opening forms an acute angle with a scrap feed into the second channel section.

3. The scrap feed according to claim 1, wherein the suction opening extends over an entire width of a scrap feed into the second channel section.

4. The scrap feed according to claim 1, further comprising movable flaps projecting into a free channel cross-section at an end of the first channel section facing the device for delivering scrap.

5. The scrap feed according to claim 4, further comprising additional movable or flexible flaps projecting into the free channel cross-section on a length of the first channel section between the extraction device and the device for delivering scrap.

6. A continuous scrap feed in an electric arc smelting furnace, comprising:

a channel including a first end that is connected with an opening in a wall of the smelting furnace;

a delivery device for delivering scrap, the delivery device located at a second end of the channel; and an extraction device for exhaust gases from a smelting process that are conducted through the channel and serve to preheat the scrap, wherein the extraction device is connected with the channel between the first end and the second end, wherein:

with regard to a total length of the channel, the extraction device is disposed closer to the first end of the channel facing the smelting furnace than the second end facing the device for delivering scrap, the extraction device is constructed as a single stage fan having a suction opening substantially aligned in a direction towards the smelting furnace, a clear cross-section of a first channel section between the extraction device and the device for delivering scrap has a smaller cross-section than a clear cross-section of a second channel section between the extraction device and the smelting furnace, and the clear cross-section of the first channel section between the extraction device and the device for delivering scrap is so matched to a quantity of scrap to be fed that a height of a scrap charge substantially fills out the clear cross-section of the first channel section, wherein the suction opening forms an acute angle with a scrap feed into the second channel section, and wherein a plane formed by the suction opening is oriented perpendicularly to a scrap feed into the second channel section, wherein a ratio of a length of the channel from the extraction device to the smelting furnace and from the extraction device to the charging device is approximately 1 to 6.

7. The scrap feed according to claim 6, wherein the suction opening forms an acute angle with the scrap feed.

8. The scrap feed according to claim 6, wherein a plane formed by the suction opening is oriented substantially perpendicular to the scrap feed.

\* \* \* \* \*